(12) United States Patent
Mains

(10) Patent No.: US 6,942,269 B2
(45) Date of Patent: Sep. 13, 2005

(54) REMOVABLE STORAGE SHELF FOR A VEHICLE STORAGE COMPARTMENT

(75) Inventor: David R. Mains, Niceville, FL (US)

(73) Assignee: Katie-Korp of the Emerald Coast, Inc., Niceville, FL (US)

( * ) Notice: Subject to any disclaimer, the term of this patent is extended or adjusted under 35 U.S.C. 154(b) by 0 days.

(21) Appl. No.: 10/761,104

(22) Filed: Jan. 20, 2004

(65) Prior Publication Data
US 2005/0156445 A1 Jul. 21, 2005

(51) Int. Cl.[7] .............................................. B60R 7/04
(52) U.S. Cl. ............................... 296/37.16; 296/36.04; 108/44; 211/187; 248/149; 248/172; 248/173; 248/163.1; 248/166; 248/434; 248/439; 224/539; 224/542; 224/549; 224/550
(58) Field of Search .............................. 296/37.1, 37.6, 296/37.16, 36.02, 26.04, 26.08; 108/44; 211/187; 248/149, 172, 173, 128, 136, 163.2, 163.1, 248/166, 434, 439; 224/539, 540, 542, 549, 224/550, 925, 311, 555, 564, 551, 42.34

(56) References Cited

U.S. PATENT DOCUMENTS

| | | | | |
|---|---|---|---|---|
| 3,709,159 A | * | 1/1973 | Oglesby, Jr. | 108/44 |
| 3,866,994 A | * | 2/1975 | Bonin | 312/236 |
| 6,062,146 A | * | 5/2000 | Conners et al. | 108/44 |
| 6,092,708 A | * | 7/2000 | Rand | 224/542 |
| 6,224,128 B1 | | 5/2001 | Mains | |
| 6,406,083 B2 | * | 6/2002 | Bharj et al. | 296/37.16 |
| 6,533,340 B1 | * | 3/2003 | Gaunzon et al. | 296/37.16 |
| 6,824,192 B2 | * | 11/2004 | Hoffmann | 296/102 |
| 2004/0056059 A1 | * | 3/2004 | Delgado et al. | 224/539 |

* cited by examiner

Primary Examiner—Lori L. Coletta
(74) Attorney, Agent, or Firm—Jason A. Bernstein; Powell Goldstein LLP

(57) ABSTRACT

A removable shelf assembly for vehicles (e.g., sport utility vehicles) to increase storage capacity in a generally flat rearwardly extending bed defined by a floor and pair of upwardly extending side walls, the shelf assembly comprising a frame composed of a plurality of U-shaped members, each member having a base and two spaced apart arms extending perpendicular to the base, a plurality of telescoping members associated with the arms, means for removably locking each arm of each the U-shaped member, whereby to adjustably fix the spaced apart bases; and, a first and second generally planar panel members positioned on the frame for receiving items to be transported thereon, the panel members associated with the frame to allow movement between the panel members. The frame preferably has a raised lip extending substantially around the frame so as to reduce movement of items placed on the frame. A downwardly depending leg which is able to pivot out of the way when needed provides additional load support. A plurality of locking thumbscrews are fitted within holes in the frame to removably lock the panels in a fixed relationship. A cushion material preferably is associated with the underside of a portion of the panels and provides cushioned support where the panels rest on the sidewalls. Preferably, a plurality of elastic tether cords are attachable to the shelf assembly and the floor tethers in the vehicle to provide further support.

20 Claims, 3 Drawing Sheets

REMOVABLE STORAGE SHELF FOR A VEHICLE STORAGE COMPARTMENT

FIELD OF THE INVENTION

The present invention relates to adjustable shelf assemblies for removable mounting in a vehicle, such as a sport utility vehicle, truck or mini-van. The shelf assembly mounts between the vehicle interior sidewalls and locks in place to provide increased storage area.

BACKGROUND OF THE INVENTION

Present day vehicles such as, but not limited to, sport utility vehicles ("SUV's"), vans, mini-vans, flatbed trucks, and the like provide increased storage capacity over traditional station wagons, with the storage is typically being a single large rear compartment behind the last row of seats. Some vehicle manufacturers have developed flexible covers that cover a portion of the compartment, e.g., to reduce exposure to the sun or prevent the contents from being viewed by people on the outside. These flexible covers are not well adapted to support any appreciable weight. Cargo nets have been used to reduce adverse movement of the contents during transport, but likewise cannot support appreciable weight.

U.S. Pat. No. 6,224,128 B1, issued to the same inventor as the present invention, provides an improved shelf assembly designed for typical use in a flat bed pickup truck with a topper installed. That unit is designed, in part, for slidable use in a compartment that is typically longer than a conventional SUV or mini-van. Other patents exist which disclose various types of toolboxes and storage areas.

It would be desirable to have an adjustable and removable shelf to increase effective storage capacity, such as for groceries or other items which are currently either stacked on top of each other, or not able to be effectively stored. It would also be desirable to have an adjustable shelf that is able to be mounted in a vehicle's storage compartment area and adapt to various widths and heights of the possible compartment. It would also be desirable for such a shelf to be removable from the vehicle and be able to be used as a free-standing table for independent use.

SUMMARY OF THE INVENTION

The present invention provides a shelf assembly for use in SUV's and other vehicles to increase storage capacity. The invention provides, in one exemplary embodiment, a shelf assembly for mounting in a vehicle having a generally flat rearwardly extending bed defined by a floor and pair of upwardly extending side walls, whereby the shelf assembly comprises a frame composed of a plurality of U-shaped members, each member having a base and two spaced apart arms extending perpendicular to the base, a plurality of telescoping members associated with the arms, means for removably locking each arm of each the U-shaped member, whereby to adjustably fix the spaced apart bases; and, a first and second generally planar panel members positioned on the frame for receiving items to be transported thereon, the panel members associated with the frame to allow movement between the panel members. The frame preferably has a raised lip extending substantially around the frame so as to reduce movement of items placed on the frame. A downwardly depending leg which is able to pivot out of the way when needed provides additional load support. A plurality of locking thumbscrews are fitted within holes in the frame to removably lock the panels in a fixed relationship. A cushion material preferably is associated with the underside of a portion of the panels and provides cushioned support where the panels rest on the sidewalls. Preferably, a plurality of elastic tether cords are attachable to the shelf assembly and the floor tethers in the vehicle to provide further support.

The shelf assembly can be installed by being placed horizontally between the sidewalls of the vehicle interior in the rear compartment and extending the panels so as to fit snugly over the sidewalls. The panels are locked in place by the thumbscrews, the leg extended and locked in place, and the elastic "bungee" cords attached to provide stability, restrict movement and additional load support.

Accordingly, it is a feature of the present invention to provide a shelf assembly for use in SUV's, mini-vans and the like to increase effective storage capacity by providing a horizontal shelf that has sufficient support strength to allow a user to place an appreciable amount of weight on the shelf assembly.

It is another feature of the present invention to provide a vehicle shelf assembly that can be adjustably installed between the sidewalls in any of a variety of different width vehicles using a system of adjustable width panels and supports.

It is another feature of the present invention to provide a shelf assembly that can be removed from the vehicle and used as a free-standing table.

Other features and advantages of the present invention will become apparent upon reading the following detailed description of embodiments of the invention, when taken in conjunction with the appended claims.

BRIEF DESCRIPTION OF THE DRAWINGS

The invention is illustrated in the drawings in which like reference characters designate the same or similar parts throughout the figures of which.

DETAILED DESCRIPTION OF THE EMBODIMENTS

The present invention relates to an adjustable shelf assembly to be used in conjunction with a vehicle, such as, but not limited to, an SUV, mini-van, van, truck or the like, having a flat bed extending rearwardly from the back seat area, and a pair of parallel side walls. For the purposes of the present invention, an SUV will be discussed as a nonlimiting example. SUV's commonly have tie down areas mounted in the floor.

Figure 1:
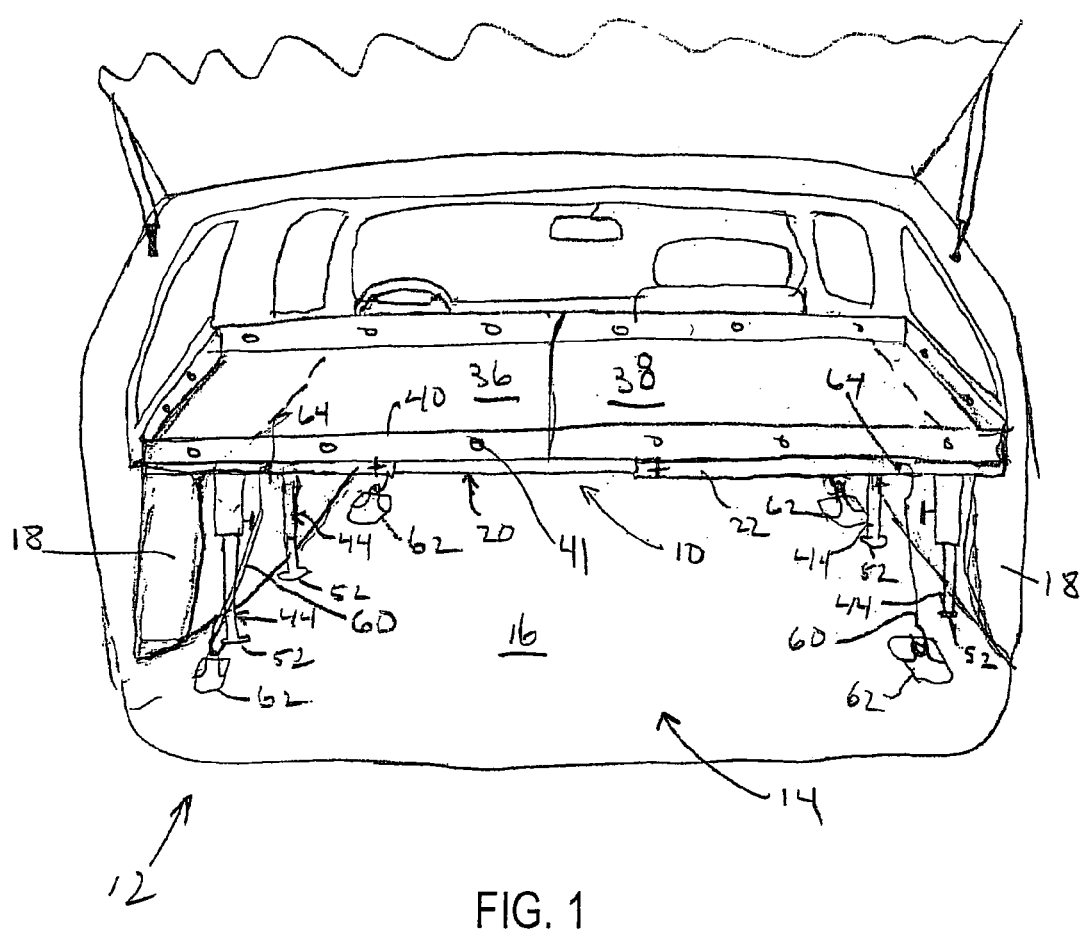
FIG. 1 is a perspective view of one exemplary embodiment of the present invention shown in position within a vehicle.

FIG. 1 shows one exemplary embodiment of a shelf assembly 10 of the present invention positioned in a vehicle 12 storage compartment 14 above the floor 16 and resting on the side walls 16. The assembly 10, as more fully illustrated in FIG. 2, has a frame member 20 composed of at least one pair of preferably U-shaped tubular members 22, where such members are defined by a base 24 and a pair of arms 26 extending generally perpendicular to the base 24. The members 22 are preferably made of metal, but can be made of other generally rigid durable material known to those skilled in the art, such as, but not limited to alloy, plastic, composite, combinations thereof or the like. The respective aligned arms 26 of the U-shaped members 22 are joined by intermediate, bridging support members 28. By this arrangement, the U-shaped members 22 may be fixed relative to one another in a variety of positions to accommodate different sized SUV compartments. The desired fixed position is to fix the respective bases 24 a distance equal to about the interior distance between the pair of side walls 18.

Preferably, though not mandatorily, a third arm 29 extends from each tubular member 22 and generally midway between and parallel to the arms 26 to provide additional support to the assembly 10. The third arms are preferably constructed similar to the arms 26. Preferably, a bridge support member 28 extends at least partially between the two third arms to allow for movement of the panels with respect to each other.

In each arm 26, 29 is defined at least one hole 30, preferably threaded, which can accommodate a fastener 32, preferably male-threaded, such as, but not limited to a thumbscrew, pin, bolt, or other fasteners, such as a cotter pin, clip, clamp, or the like. Optionally, a threaded nut 34 can be welded, glued or otherwise attached to the arm over the hole to provide additional strength around the hold area. The hole 30 can be on the side or bottom surface of the arm 26, 29.

Overriding the frame member are a pair of overlapping planar panels 36, 38, made of a generally rigid material, such as, but not limited to, wood, a light weight metal (e.g., aluminum, steel or the like), composite, plastic or the like to function as the supporting surface for items to be stored thereon. Preferably, though not mandatorily, a lip 40 extends upward from at least a portion of at least one side of the edge of the panels 36, 38. The lip 40 is designed to reduce movement of items on the shelf assembly 10 during transport or use. Preferably, the lip 40 extends substantially around the periphery of the panels 36, 38, with a lower height along the edge facing the back door of the vehicle 12 to facilitate placement and removal of items.

Optionally, the shelf assembly can incorporate a cover (not shown), such as, but not limited to, a conventional cargo net, web, mesh cover, preferably elastic, or the like that would extend at least partially over the frame and connect via hooks, clips, or the like to the lip 40 by means of a plurality of spaced holes 41, or hooks, clips, or the like to hold the cover. The cover can be used to restrict movement of items on the panels when the vehicle is moving.

Figure 2:
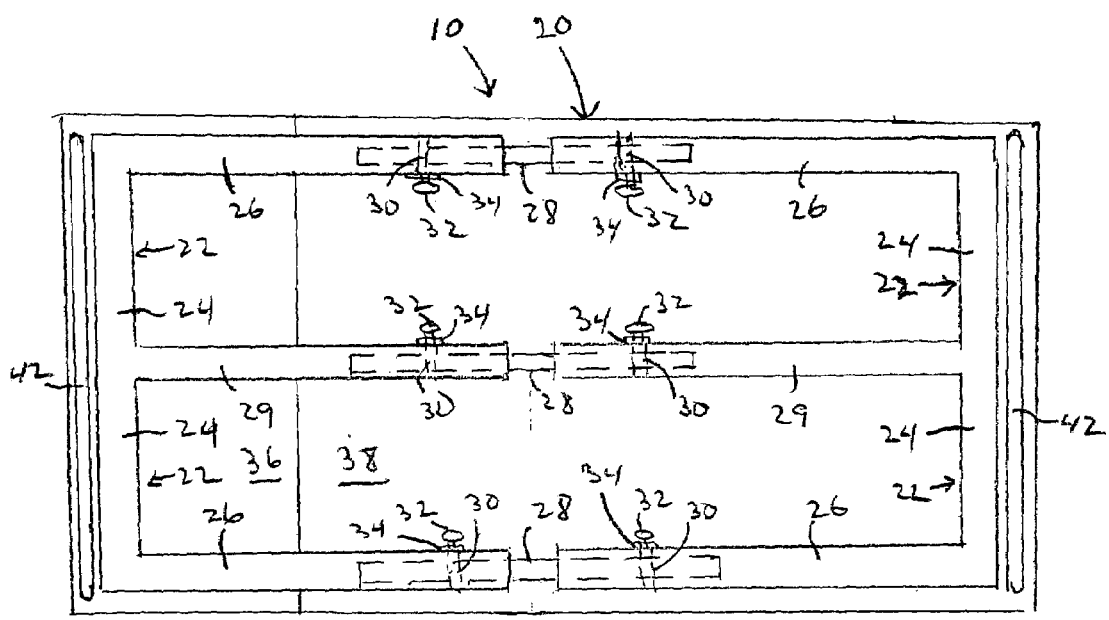
FIG. 2 is bottom view of the embodiment of FIG. 1.

Preferably, though not mandatorily, a cushion material 42 is attached to the underside of a portion of the frame 20, generally at the base 24, on each side of the shelf assembly 10. When the shelf assembly 10 is positioned over and between the side walls 18 of the vehicle 12 the cushion 42 will rest on the side walls, thereby reducing the likelihood of scratching or marring of the vehicle interior. The cushion 42 also reduces the chance of rattling when the shelf assembly 10 is installed and the vehicle is moving. The cushion 42 can be an extended surface, as shown in FIG. 2, or can be of a smaller size and placed, e.g., by adhesive, on the corners of the underside of the base 24 and possibly midways on the base 24. The type of cushion can be selected according to any of many types of cushioning material known to those skilled in the art, including, but not limited to, foam, Styrofoam, rubber, carpeting, plastic, or the like.

Figure 3:
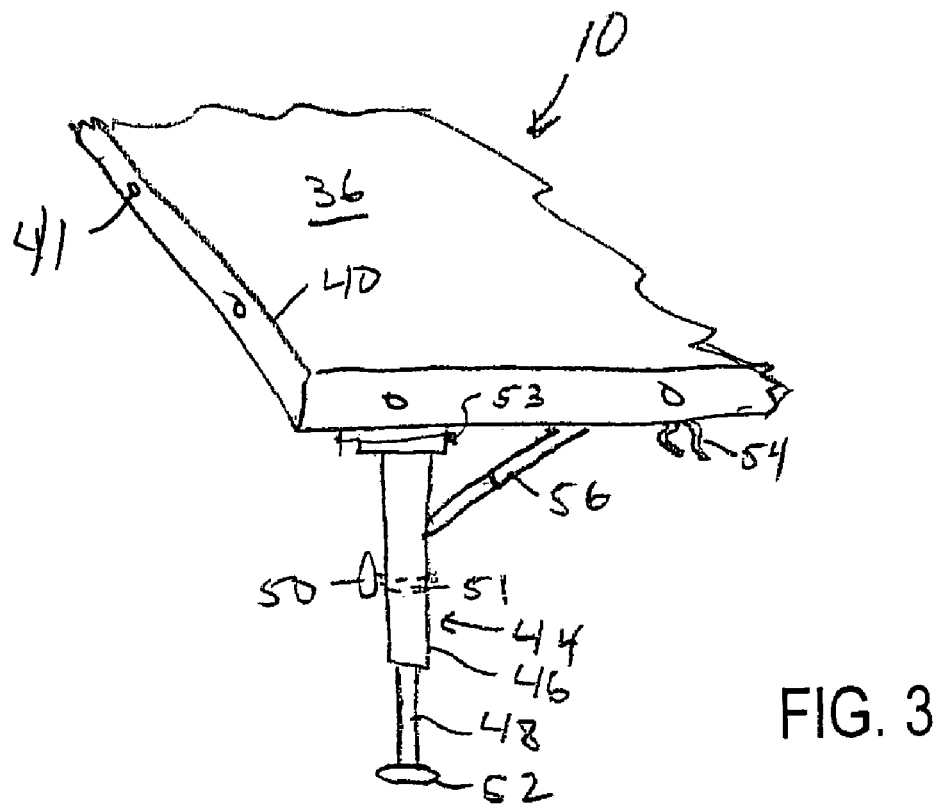
FIG. 3 is a detail view of the leg assembly in the vertical position.
Figure 4:
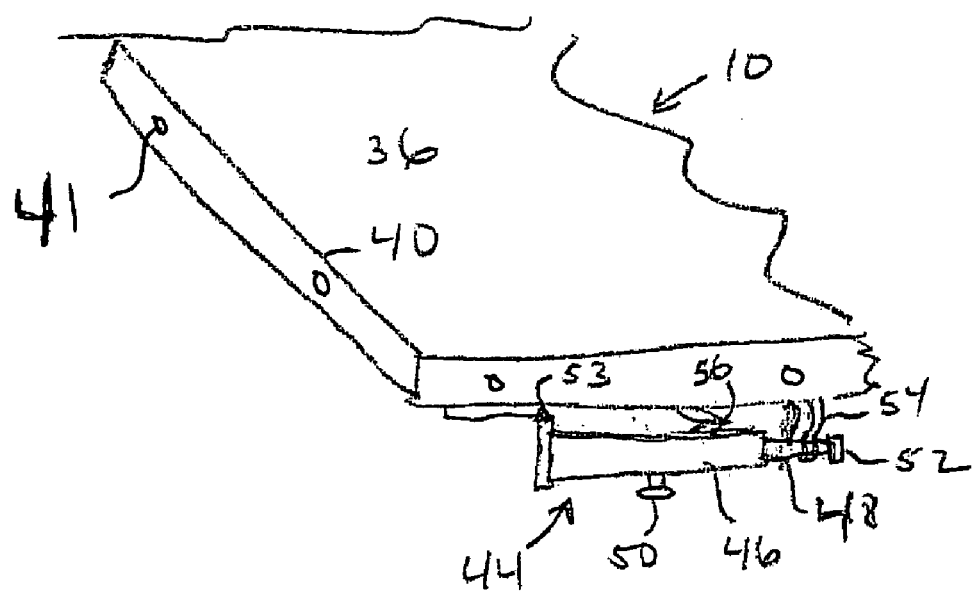
FIG. 4 is a detail view of the leg assembly in the horizontal position.

To provide additional support for heavier loads, as shown in FIGS. 3–4, at least one optional leg 44 may be used. The leg 44 may be of a single piece construction, or preferably can be two or more telescoping segments 46, 48. Where a telescoping leg assembly is used, the two or more telescoping segments 46, 48 can be held in place by means of a thumbscrew 50 received within at least one preferably threaded hole 51 in at least one leg segment 46, 48 such that when the thumbscrew 50 is advanced within the hole 51 it contacts and presses against the inner telescoping segment 48 to prevent relative movement of the segments 46, 48. A second end 48 of the leg 44 may terminate in a foot 52 which may optionally be covered with a material, such as, but not limited to, plastic, rubber or the like and may be used to reduce marring of the vehicle floor surface. A first leg 46 is attached to either the frame 20 or preferably one or more of the panels 36, 38, such as by a hinged plate 53. In this manner the leg 44 can pivot on the hinge 53 to vertical position (see FIG. 3) when used as a support, and pivot to a horizontal position (see FIG. 4) when not needed. When in the horizontal position the leg 44 can be removably held as such by a retention device 54, such as a clip, clamp, or the like. Optionally, a pivotable bracket 56 can be associated with the leg to maintain the leg in the vertical position. In a preferred exemplary embodiment, four legs 44, one at generally each corner of the shelf assembly 10 are used. It is therefore possible to remove the shelf assembly 10 from the vehicle 12 and, when the legs 44 are extended and locked in place, use the assembly 10 as a free standing table, such as at a tailgate party, flea market or the like. The legs 44 can also be used to support the shelf assembly 10 within a vehicle 12 that does not have interior side walls 18. To set up the shelf assembly 10, the respective U-shaped members 18 are interfitted with intermediate members 24 to a rectangular size consistent with the side walls 12 of the vehicle bed. The cushion 42, if used, will rest on the sidewalls 18, if any, of the vehicle 12.

The shelf assembly 10 is positioned in the vehicle 12 in a horizontal orientation and the two panels 36, 38 extended so that the base members 24 and cushions 42, if any, rest on the vehicle sidewalls 18. When the desired extended position is reached, the fasteners 32, e.g., thumbscrews, are turned in the holes 30 so that the end of the screw presses against the telescoping member 28 so that the assembly 10 is locked into position and lateral movement is restricted.

Where the leg 44 is used, after the shelf assembly 10 is mounted in position the leg 44 is pivoted and, if appropriate, telescoped to reach the floor 16 of the vehicle 12. If a bracket 56 is used, it may be pivoted and the bracket 56 locked in place to maintain the leg 44 in the vertical position.

The shelf assembly 10 may be further secured by attaching one end of one or more preferably elastic cords 60, such as bungee or rope, to the attachment tethers 62 commonly found in the floor of the storage area of vehicles so equipped and the other end of the cord(s) 60 to at least one tether 64 on the shelf assembly 10. The tether 64 may comprise, without limitation, a hook, loop, eye-bolt or the like to which the cords 60 can be attached.

An advantage of the present invention is that it provides a compact, easily usable support assembly for vehicles with storage areas. The assembly 10, when not in use, can be stored without requiring much room. The assembly 10 can be expanded or contracted to securely fit in any of a number of different vehicle designs. The strength of the present invention permits it to hold substantial weight or act as a work surface while allowing for storage of and access to items underneath of the assembly. It is also possible to design the panels 36 and 38 to be three or more panels which may overlap, thus reducing the overall width of the unit.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

I claim:

1. A shelf assembly for mounting in a vehicle having a generally flat rearwardly extending bed defined by a floor and pair of upwardly extending side walls, said shelf assembly comprising:
   a. a frame comprising,
      i) a plurality of U-shaped members, each said member having a base and two spaced apart arms extending perpendicular to said base,
      ii) a plurality of telescoping members associated with said arms,
      iii) means for removably locking each arm of each said U-shaped member, whereby to adjustably fix said spaced apart bases; and,
   b. a first and second generally planar panel members positioned on said frame for receiving items to be transported thereon, said panel members associated with said frame to allow movement between said panel members.

2. The shelf assembly of claim 1, further comprising a raised lip extending at least a portion around the periphery of said panel.

3. A shelf assembly for mounting in a vehicle having a generally flat rearwardly extending bed defined by a floor and pair of upwardly extending side walls, said shelf assembly comprising:
   a. a frame comprising,
      i) a plurality of U-shaped members, each said member having a base and two spaced apart arms extending perpendicular to said base,
      ii) a plurality of telescoping members associated with said arms,
      iii) means for removably locking each arm of each said U-shaped member, whereby to adjustably fix said spaced apart bases; and,
   b. a first and second generally planar panel members positioned on said frame for receiving items to be transported thereon, said panel members associated with said frame to allow movement between said panel members; and,
   c. a raised lip extending at least a portion around the periphery of said first and second panel members, wherein said lip contains a plurality of spaced holes.

4. The shelf assembly of claim 1, further comprising a support means associated with said frame, wherein said support means comprises at least one downwardly depending leg associated with said shelf assembly.

5. A shelf assembly for mounting in a vehicle having a generally flat rearwardly extending bed defined by a floor and pair of upwardly extending side walls, said shelf assembly comprising:
   a. a frame comprising,
      i) a plurality of U-shaped members, each said member having a base and two spaced apart arms extending perpendicular to said base,
      ii) a plurality of telescoping members associated with said arms,
      iii) means for removably locking each arm of each said U-shaped member, whereby to adjustably fix said spaced apart bases; and,
   b. a first and second generally planar panel members positioned on said frame for receiving items to be transported thereon, said panel members associated with said frame to allow movement between said panel members;
   c. a support means associated with said frame, wherein said support means can pivot from a downwardly vertical position to a generally horizontal position.

6. The shelf assembly of claim 4, wherein said support means further comprises a pin and a hinge, said hinge having a first plate associated with said support means and a second plate associated with said panel member, whereby said pin pivotably connects said first and second plates.

7. The shelf assembly of claim 5, further comprising a means for removably retaining said support means in a horizontal position.

8. The shelf assembly of claim 6, wherein said retaining means comprises a clip sized to removably hold a portion of said support member.

9. The shelf assembly of claim 1, further comprising a support member associated with said frame, wherein said support member further comprises a bracket for removably maintaining said support member in a vertical position with respect to said panels.

10. The shelf assembly of claim 3, further comprising a support means associated with said frame, wherein said support means comprises at least one telescoping leg associated with said frame.

11. The shelf assembly of claim 10, further comprising a support means associated with said frame, wherein said telescoping leg comprises at least two telescoping segments.

12. The shelf assembly of claim 11, further comprising a thumbscrew receivable within a hole in a telescoping segment wherein said telescoping segments are selectively maintained in a fixed relationship when said thumbscrew is advanced in said hole and contacts another telescoping segment.

13. The shelf assembly of claim 1, wherein said locking means comprises a plurality of thumbscrews which are removably received within mating apertures in said frame.

14. The shelf assembly of claim 13, further comprising a nut attached to said frame axially aligned with said aperture to provide additional strength for said thumbscrew.

15. The shelf assembly of claim 1, further comprising a cushion associated with at least a portion of each said U-shaped member.

16. The shelf assembly of claim 1, further comprising a plurality of tethers for connecting said shelf assembly to a vehicle to prevent substantial undesired movement when said shelf assembly is mounted in said vehicle.

17. A shelf assembly for mounting in a vehicle having a generally flat rearwardly extending bed defined by a floor and pair of upwardly extending side walls, said shelf assembly comprising:
   a. a frame comprising,
      i) a plurality of U-shaped members, each said member having a base and two spaced apart arms extending perpendicular to said base,
      ii) a plurality of telescoping members associated with said arms,
      iii) means for removably locking each arm of each said U-shaped member, whereby to adjustably fix said spaced apart bases;
   b. a first and second generally planar panel members positioned on said frame for receiving items to be transported thereon, said panel members associated with said frame to allow movement between said panel members; and, It should further be noted that any patents, applications and publications referred to herein are incorporated by reference in their entirety.

c. a plurality of tethers for connecting said shelf assembly to a vehicle to prevent substantial undesired movement when said shelf assembly is mounted in said vehicle.

18. A shelf assembly for mounting in a vehicle having a generally flat rearwardly extending bed defined by a floor and pair of upwardly extending side walls, said shelf assembly comprising:
   a. a frame comprising,
      i) a plurality of U-shaped members, each said member having a base and two spaced apart arms extending perpendicular to said base,
      ii) a plurity of telescoping members associated with said arms,
      iii) means for removably locking each arm of each said U-shaped member, whereby to adjustably fix said spaced apart bases,
      iv) a raised lip extending at least a portion around the periphery of said frame;
   b. a first and second generally planar panel members positioned on said frame for receiving items to be transported thereon, said panel members associated with said frame to allow movement between said panel members;
   c. at least one leg depending downward from said shelf assembly.

19. The shelf assembly of claim 17, wherein said shelf assembly is connected to said tether by an elastic cord.

20. The shelf assembly of claim 1, wherein said first and second panels can be movably adjusted to be at least partially overlapping each other.

* * * * *